UNITED STATES PATENT OFFICE 2,546,545

PROCESS FOR THE SEPARATION OF ISOMERIC CHLOROBENZOIC ACIDS

Jonas Kamlet, New York, N. Y., assignor to Tennessee Products & Chemical Corporation, Nashville, Tenn., a corporation of Tennessee No Drawing. Application December 22, 1950, Serial No. 202,397

1 Claim. (Cl. 260—525)

The present invention relates to a process for the separation of isomeric chlorobenzoic acids and, more particularly, it relates to a simplified procedure for the separation of ortho-chlorobenzoic acid and para-chlorobenzoic acid from mixtures of these two isomers. It has for its purpose to provide a simple and inexpensive means for the separation of ortho-chlorobenzoic acid and para-chlorobenzoic acid so that these two valuable organic intermediates can be made from cheap and readily available raw materials (e. g., toluene and chlorine) without the necessity of submitting any of the intermediates of said process to an expensive and tedious separation by means of fractional distillations or an equally expensive and involved separation by chemical reactions.

Ortho- and para-chlorobenzoic acids are now made by the sequence of steps involved in:

(a) Chlorinating toluene in the ring to yield a mixture of ortho- and para-chlorotoluenes, (b) Separating the ortho-chlorotoluene (B. Pt. 158.5° C. @ 760 mm.) and the para-chlorotoluene (B. Pt. 162.0°–162.2° C. @ 760 mm.) by fractional distillation or by chemical means, and (c) Oxidizing each isomer individually to the corresponding chlorobenzoic acid by any convenient means. Thus, p-chlorotoluene can be oxidized to p-chlorobenzoic acid by reaction with sodium bichromate and sulfuric acid; o-chlorotoluene can be chlorinated in the side chain and the resultant o-chlorobenzotrichloride hydrolyzed to o-chlorobenzoic acid, et cetera.

The separation of the isomeric o- and p-chlorotoluenes by fractional distillation is quite difficult, however, inasmuch as they differ in boiling points by only 3.5° C. It has also been proposed to sulfonate the mixture of o- and p-chlorotoluene, whereby the ortho isomer is preferentially sulfonated, separating the ortho-chlorotoluene, para-sulfonic acid from the unreacted para-chlorotoluene, and regenerating the ortho-chlorotoluene from the former compound by distillation with superheated steam (Wahl, German Patent 376,634; Seelig, Annalen 237, 152 (1887)). However, this complicated chemical separation is usually considered impractical and has found no widespread acceptance. It has also been proposed to separate the isomeric ortho- and para-chlorobenzoic acids by virtue of their different solubilities in various solvents, such as water, benzene, heptane, etc., by virtue of the different water solubilities of their calcium salts, and by virtue of their varying reactivities with ammonia and alkylamines (Mills, U. S. Patent 1,882,335 of October 11, 1932). However, these methods of separation have proven to be suitable for technical purposes.

It is well known that toluene can be chlorinated in the ring in the presence of substitution catalysts, to yield a mixture of 55%–60% of ortho-chlorotoluene and 40%–45% of para-chlorotoluene. This mixture of chlorotoluene (freed of the catalyst by distillation) can then be chlorinated in the side-chain, in the scrupulous absence of substitution catalysts and usually with the catalytic assistance of ultraviolet irradiation, to yield a mixture of ortho-chlorobenzotrichloride and para-chlorobenzotrichloride. The latter mixture can then be hydrolyzed (in one step or in two steps) to the corresponding mixture of o- and p-chlorobenzoylchlorides and finally to a mixture of 55%–60% of o-chlorobenzoic acid and 40%–45% of p-chlorobenzoic acid.

The basis of the present invention is the discovery that a good separation of o-chlorobenzoic acid and p-chlorobenzoic acid can be effected by fractional solution of the mixture of these isomers in a solvent selected from the group consisting of o-chlorotoluene, p-chlorotoluene and preferably mixtures thereof, in which the o-chlorobenzoic acid is markedly more soluble than the p-chlorobenzoic acid. An important feature of this invention is its economy as well as efficiency in that the solvent mixture of o-chlorotoluene and p-chlorotoluene is recovered and oxidized to form o-chlorobenzoic and p-chlorobenzoic acids.

I have found that a good separation of o-chlorobenzoic acid and p-chlorobenzoic acid can be effected by agitating a mixture of these isomers with a quantity of the solvent sufficient to dissolve all of the o-chlorobenzoic acid and only a minimum amount of the p-chlorobenzoic acid, preferably at a temperature above 20° C., and thereafter separating the solution of o-chlorobenzoic acid from the insoluble precipitate of p-chlorobenzoic acid (as e. g., by filtration). On cooling the solution, o-chlorobenzoic acid precipitates out and may be recovered by filtration. As a solvent, the cheapest and most readily available for use is the unseparated mixture of ortho- and para-chlorotoluenes obtained by the ring-chlorination of toluene and either pure or as recovered in the separation treatment. To determine the composition of this mixture, the crystallization point of the mixed chlorotoluenes is determined and the composition interpolated from the following table:

| Per Cent Para-Chloro-toluene | Per Cent Ortho-Chloro-toluene | Crystallization Point, °C. |
|---|---|---|
| 100 | 0 | 7.3 |
| 90 | 10 | 2.0 |
| 80 | 20 | −3.5 |
| 70 | 30 | −9.5 |
| 60 | 40 | −16.2 |
| 50 | 50 | −24.4 |
| 40 | 60 | −34.0 |
| 30 | 70 | −46.5 |
| 20 | 80 | −49.0 |
| 10 | 90 | −43.0 |
| 0 | 100 | −37.0 |

The following example is given to define and illustrate the present invention, but in no way to limit it to reagents, proportions or conditions described therein. Obvious modifications and improvements will occur to any person skilled in the art.

Example

A mixture of 55%–60% o-chlorobenzoic acid and 40%–45% p-chlorobenzoic acid (obtained by the ring chlorination of toluene to o- and p-chlorotoluene, the further side-chain chlorination of the latter to o- and p-chlorobenzotrichloride and the hydrolysis of the latter to a mixture of o- and p-chlorobenzoic acids) is ground to 100 mesh fineness.

To 500 parts by weight of the ground, mixed chlorobenzoic acids, add 600 parts by weight of mixed chlorotoluenes (55%–60% o- and 40%–45% p-) and heat, with agitation, for two hours, at 100°–105° C. Filter the mixture rapidly. Care must be taken to keep the receiver warm (over 90° C.) to avoid premature precipitation of the o-chlorobenzoic acid.

The residue on the filter is now added to another 600 parts by weight of mixed chlorotoluenes and heated, with agitation, at 100°–105° C. for one hour. The mixture is again filtered rapidly. The warm filtrate is combined with the filtrate from the first extraction, which has been kept warm in the interval.

On slowly cooling the mixed filtrates to 70° C., a small precipitate of mixed chlorobenzoic acids settles out. This is filtered off rapidly and added to the next batch of mixed chlorobenzoic acids for separation.

The filtrate is then cooled slowly, to room temperature, and the copious precipitate of o-chlorobenzoic acid which separates out is filtered off and dried in a hot air oven at a temperature not in excess of 110° C. The filtrate which is a solvent mixture of the mixed toluenes, namely o- and p-chlorotoluenes, with traces of p-chlorobenzoic acid and o-chlorobenzoic acid is returned to the process for oxidation to o- and p-chlorobenzoic acids or may be reused as the separation solvent. The process of this invention is, therefore, highly efficient and economical.

With credit for recovered mixed chlorobenzoic acids, there is thus obtained from 500 parts of mixed chlorobenzoic acid, 292 parts of o-chlorobenzoic acid melting at 137°–139° C. (melting point when pure—142° C.), and 188 parts of p-chlorobenzoic acid melting at 238° C.–241° C. (melting point when pure—243° C.). These correspond in purity to the technical ortho- and para-chlorobenzoic acids heretofore obtained by other and more complicated procedures.

The composition of mixtures of ortho- and para-chlorobenzoic acids may be determined by melting the mixture and noting the temperature at which the initial crystallization takes place. The following table can be used for interpolating the initial crystallization point as a function of the composition of the mixture:

| Per Cent Para-Chloro-benzoic Acid | Per Cent Ortho-Chloro-benzoic Acid | Initial Crystallization Point, °C. |
|---|---|---|
| 0.0 | 100.0 | 142.0 |
| 10.0 | 90.0 | 135.6 |
| 14.8 | 85.2 | [1] 132.0 |
| 20.0 | 80.0 | 142.1 |
| 22.0 | 78.0 | 152.6 |
| 25.0 | 75.0 | 160.1 |
| 28.0 | 72.0 | 164.4 |
| 30.0 | 70.0 | 167.5 |
| 35.0 | 65.0 | 175.0 |
| 40.0 | 60.0 | 182.5 |
| 45.0 | 55.0 | 191.0 |
| 50.0 | 50.0 | 196.8 |
| 60.0 | 40.0 | 203.7 |
| 70.0 | 30.0 | 213.2 |
| 80.0 | 20.0 | 228.4 |
| 90.0 | 10.0 | 235.6 |
| 100.0 | 0.0 | 243.0 |

[1] Eutectic.

The eutectic point is 132.0° C., corresponding to a mixture of 14.8% of para-chlorobenzoic acid and 85.2% of ortho-chlorobenzoic acid. It will be noted that compositions containing from 100% ortho/0% para to 85.2% ortho/14.8% para solidify from 142.0° C. to 132.0° C., whereas compositions containing from 85.2% ortho/14.8% para to 80.2% ortho/19.8% para solidify from 132.0° C. to 142.0° C.

Thus, if a sample of unknown composition melts between 132.0° C. and 142.0° C. it is advisable to dissolve a small amount of pure para-chlorobenzoic acid in a melt of the unknown composition, and determine the initial solidification point of the mixture. If the initial solidificaton point of the mixture is lower than that of the original sample, the sample contains between 100.0% ortho/0.0% para and 85.2% ortho/14.8% para chlorobenzoic acids. If the initial solidification point is higher than that of the original sample, the sample contains between 85.2% ortho-/14.8% para and 80.2% ortho/19.8% para chlorobenzoic acids.

This application is a continuation-in-part of my application Serial No. 84,736, filed March 31, 1949.

I claim:

A process for the preparation of o-chlorobenzoic acid and insoluble p-chlorobenzoic acid which comprises agitating a mixture of the acids with a solvent mixture of o-chlorotoluene and p-chlorotoluene, selectively dissolving substantially all of said o-chlorobenzoic acid, separating the resultant solution of o-chlorobenzoic acid from the insoluble p-chlorobenzoic acid, recovering the o-chlorobenzoic acid from said solution, and returning the solvent mixture to the process for oxidation to o-chlorobenzoic acid and para-chlorobenzoic acid.

JONAS KAMLET.

No references cited.